(12) United States Patent
Wang

(10) Patent No.: US 8,437,080 B2
(45) Date of Patent: May 7, 2013

(54) FOLDABLE PROJECTION SCREEN

(75) Inventor: Shih-Jen Wang, New Taipei (TW)

(73) Assignee: Bright Supply Corp., New Taipei (TW)

( * ) Notice: Subject to any disclaimer, the term of this patent is extended or adjusted under 35 U.S.C. 154(b) by 0 days.

(21) Appl. No.: 13/344,035

(22) Filed: Jan. 5, 2012

(65) Prior Publication Data

US 2012/0314285 A1    Dec. 13, 2012

(30) Foreign Application Priority Data

Jan. 12, 2011  (TW) .............................. 100200651 U

(51) Int. Cl.
*G03B 21/58* (2006.01)

(52) U.S. Cl.
USPC .......................................... 359/444; 359/443

(58) Field of Classification Search ............ 40/514; 428/142; 359/443–461; 181/154; 345/156
See application file for complete search history.

(56) References Cited

U.S. PATENT DOCUMENTS

| | | | | |
|---|---|---|---|---|
| 2,407,592 A * | 9/1946 | Wathen | ....................... | 40/124.15 |
| 3,054,325 A * | 9/1962 | Crockwell | ..................... | 160/377 |
| 3,560,088 A * | 2/1971 | Schwartz | ........................ | 353/78 |
| 3,601,916 A * | 8/1971 | Epstein | ........................... | 40/605 |
| 3,805,872 A * | 4/1974 | Lorber | .......................... | 160/354 |
| 6,369,943 B1 * | 4/2002 | Bachmann et al. | ............ | 359/445 |
| 6,389,935 B1 * | 5/2002 | Azima et al. | .................... | 81/388 |
| 6,466,369 B1 * | 10/2002 | Maddock | ...................... | 359/460 |
| 6,637,896 B2 * | 10/2003 | Li et al. | ......................... | 353/119 |
| 7,050,123 B2 * | 5/2006 | Liu et al. | ....................... | 348/787 |
| D544,922 S * | 6/2007 | Shaffer | ......................... | D20/10 |
| 7,595,930 B2 * | 9/2009 | Adams et al. | ................. | 359/443 |
| 7,990,613 B2 * | 8/2011 | Ansbro et al. | ................. | 359/451 |
| 2003/0098957 A1 * | 5/2003 | Haldiman | ...................... | 353/69 |
| 2007/0086088 A1 * | 4/2007 | Astill | ............................. | 359/443 |
| 2008/0158669 A1 * | 7/2008 | O'Keefe et al. | ................ | 359/443 |
| 2009/0116106 A1 * | 5/2009 | Adams et al. | ................. | 359/443 |

\* cited by examiner

*Primary Examiner* — Clayton E Laballe
*Assistant Examiner* — Kevin Butler
(74) *Attorney, Agent, or Firm* — Guice Patents PLLC

(57) ABSTRACT

The present invention provides a foldable projection screen, which comprises: a first housing capable of being folded for engagement and capable of standing while being unfolded; and a projection screen having its two sides respectively fastened on two sides of the first housing so as to be folded and accommodated in the first housing. With the mentioned structure, the foldable projection screen has advantages of small in volume, light in weight, and easy to be carried around, and applicable in a mini-sized or small projector.

19 Claims, 9 Drawing Sheets

US 8,437,080 B2

FOLDABLE PROJECTION SCREEN

BACKGROUND OF THE INVENTION

1. Field of the Invention

The present invention relates to a projection screen, especially to a foldable projection screen having advantages of small in volume, light in weight and easy to be carried around.

2. Description of Related Art

Generally, a projector or OLED TV projects the image signals to a large-dimension display panel or projection screen for obtaining a better video/audio and visual effect. A conventional foldable projection screen is often installed with a plurality of support rods which are staggeringly arranged, and two support rods at the bottom are respectively provided with a retractable rod; so with the two retractable rods, the support to the projection screen can be reinforced and the unfolding/folding operation can be facilitated.

However, the mentioned foldable projection screen requires a considerable number of support rods and two retractable rods to achieve the effect of reinforcing the support to the projection screen, therefore the volume and weight are inevitably increased and the production cost is raised.

In addition, the mentioned foldable projection screen has a relative larger volume while being folded, so the foldable projection screen may not be able to be stored in a briefcase, thereby causing an issue of not easy to be carried around.

As such, a novel foldable projection screen shall be invented for improving the mentioned problems and disadvantages.

SUMMARY OF THE INVENTION

One primary object of the present invention is to provide a foldable projection screen having advantages of small in volume, light in weight and easy to be carried around.

Another object of the present invention is to provide a foldable projection screen applicable in a mini-sized or small projector.

For achieving the mentioned objects, the present invention provides a foldable projection screen, which comprises: a first housing capable of being folded for engagement and capable of standing while being unfolded; and a projection screen having its two sides respectively fastened on two sides of the first housing.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
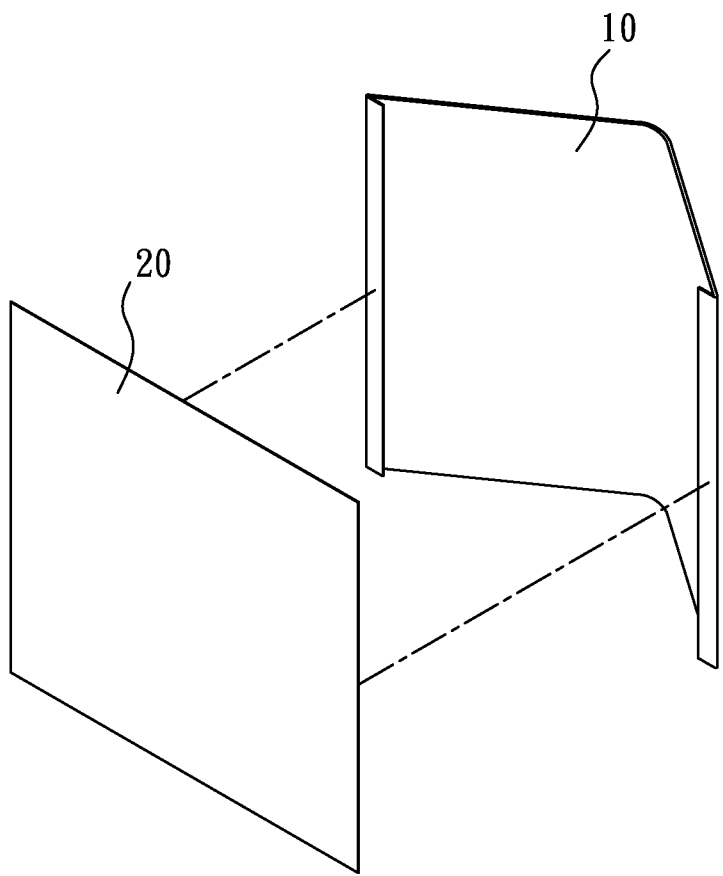
FIG. 1 is a schematic exploded view illustrating the foldable projection screen, according to one preferred embodiment of the present invention.
Figure 2:
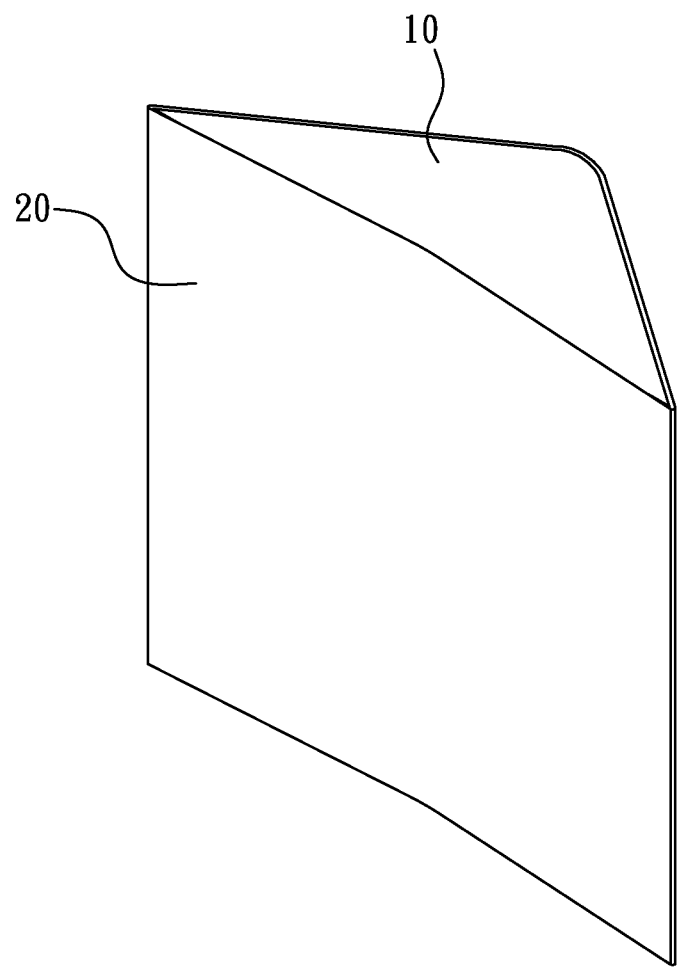
FIG. 2 is a schematic perspective view illustrating the foldable projection screen being unfolded, according to one preferred embodiment of the present invention.
Figure 3:
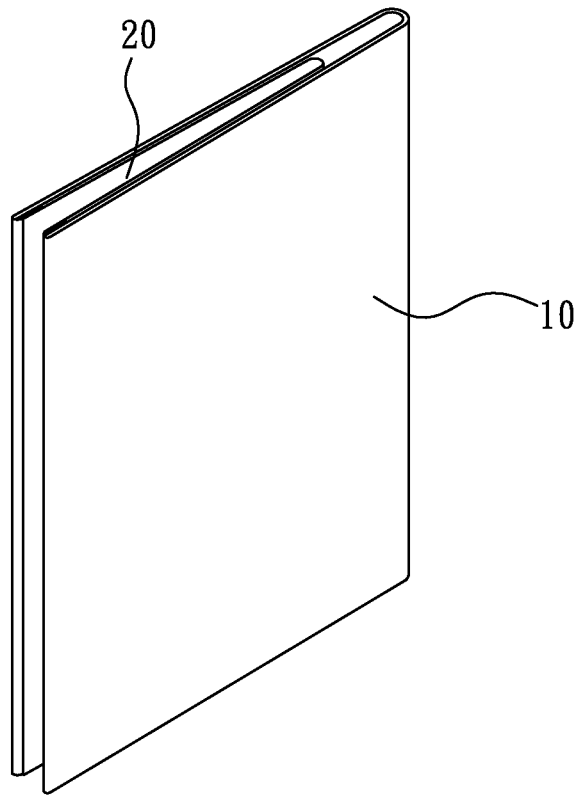
FIG. 3 is a schematic view illustrating the foldable projection screen being folded, according to one preferred embodiment of the present invention.

Referring from FIG. 1 to FIG. 3, wherein FIG. 1 is a schematic exploded view illustrating the foldable projection screen, according to one preferred embodiment of the present invention; FIG. 2 is a schematic perspective view illustrating the foldable projection screen being unfolded, according to one preferred embodiment of the present invention; and FIG. 3 is a schematic view illustrating the foldable projection screen being folded, according to one preferred embodiment of the present invention.

As shown in figures, the foldable projection screen provided by the present invention comprises: a first housing 10; and a projection screen 20.

The first housing 10 is capable of being folded for engagement. The first housing 10 is made of a material such as paper, plastic, metal or rubber, wherein while being unfolded for standing, the first housing 10 is equipped with a sufficient support force for supporting the projection screen 20.

The projection screen 20 has its two sides respectively fastened on two sides of the first housing 10 and is capable of being folded and accommodated in the first housing 10. The projection screen 20 is a high gain projection screen, and made of a material such as paper, rubber, thermoplastic elastic polymer, fabric or plastic, wherein the thermoplastic elastic polymer is, e.g. but not limited to, thermoplastic polyurethane (TPR) or thermoplastic polyurethane (TPU). In addition, the projection screen 20 is, for example, fastened on the first housing 10 through a Velcro fastener, glue, button, or iterative pressure sensitive adhesive; in this embodiment, the Velcro fastener is adopted for illustration and shall not be seen as a limitation to the scope of the present invention.

As shown in FIG. 2, when the foldable projection screen provided by the present invention is unfolded, two sides of the first housing 10 can be utilized to laterally stretch the projection screen 20, thereby achieving the object of supporting the projection screen 20, and the projection screen 20 is applicable in a mini-sized projector of a mobile phone or a small projector.

As shown in FIG. 3, when folding is desired to be processed, the two sides of the first housing 10 of the present invention are inwardly folded, so the projection screen 20 is folded and accommodated in the interior of the first housing 10, thereby enabling the projection screen 20 to be easily folded and accommodated in the first housing through the same manner of folding a file holder. As such, the present invention has advantages of easy to be folded and accommodated and convenient to be carried around.

Figure 4:
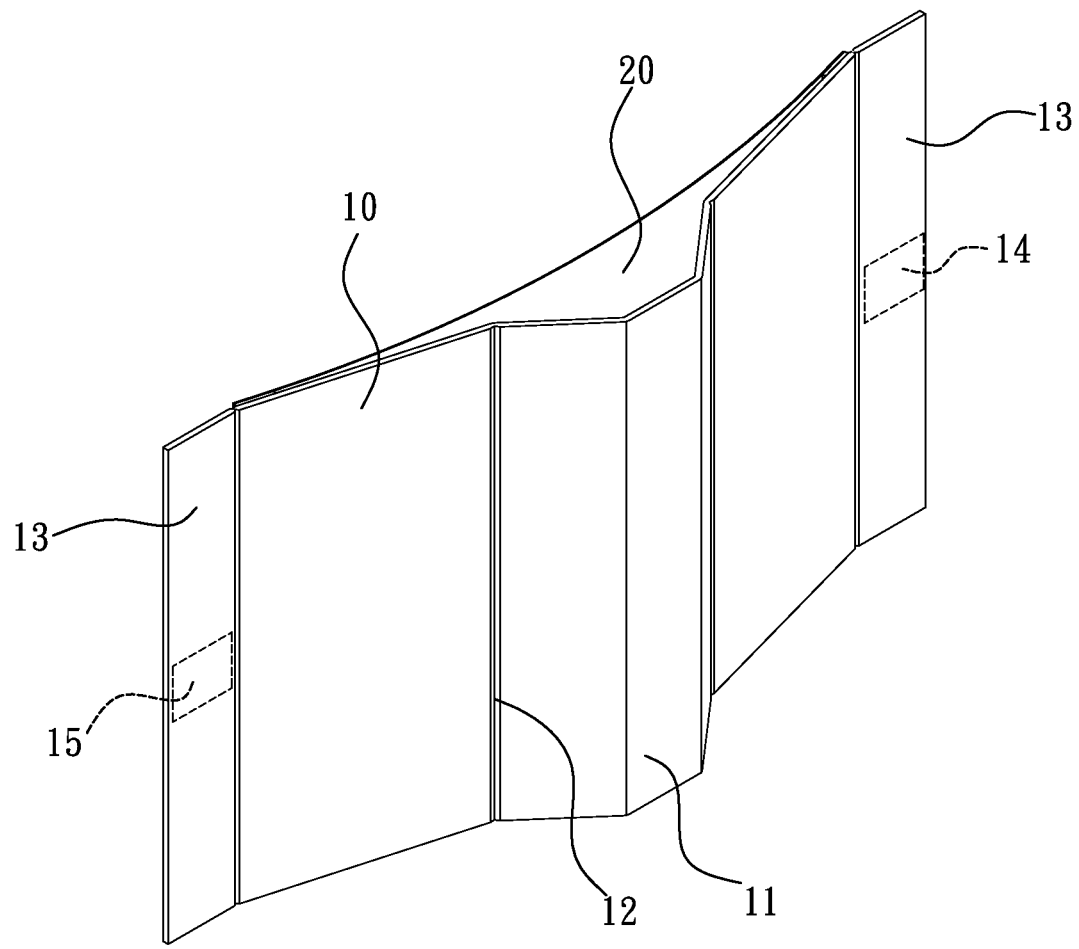
FIG. 4 is a schematic view illustrating the first housing being further formed with an outward-folded flat part, according to one preferred embodiment of the present invention.
Figure 5:
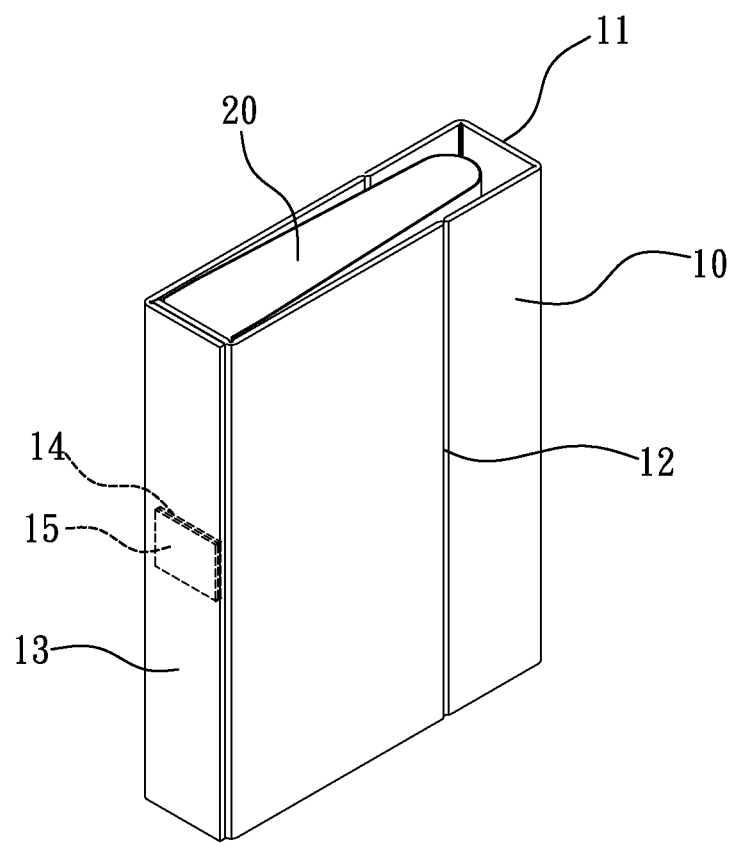
FIG. 5 is a schematic view illustrating the foldable projection screen shown in FIG. 4 being folded.

Referring to FIG. 4 and FIG. 5, wherein FIG. 4 is a schematic view showing the first housing being further formed with an outward-folded flat part, according to one preferred embodiment of the present invention; and FIG. 5 is a schematic view showing the foldable projection screen shown in FIG. 4 being folded. As shown in figures, the central portion of the first housing 10 of the present invention is further formed with an outward-folded flat part 11 having its two sides being respectively and longitudinally formed with a cut line 12, thereby enabling the first housing 10 to stand more easily. In addition, two sides of the first housing 10 are further provided with inward-folded flat parts 13, and the two inward-folded flat parts 13 respectively have a magnetic member 14, 15 with opposite magnetism, thereby folding the first housing 10 in a rectangular shape through the magnetic members 14, 15.

Figure 6:
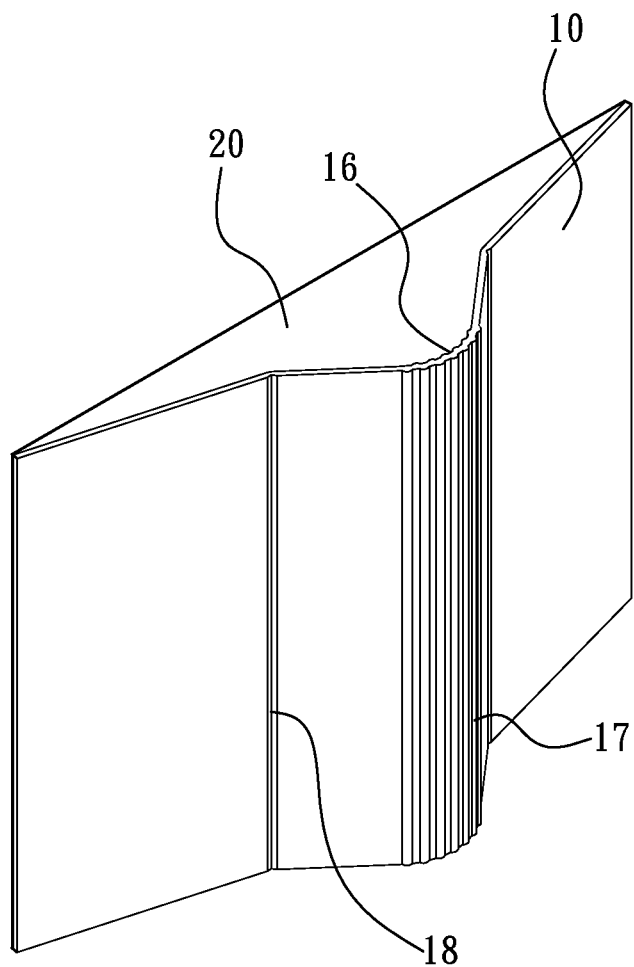
FIG. 6 is a schematic view illustrating the foldable projection screen being further formed with an arc-shaped part, according to one preferred embodiment of the present invention.

Referring to FIG. 6, which is a schematic view showing the foldable projection screen being further formed with an arc-shaped part, according to one preferred embodiment of the present invention. As shown in FIG. 6, the central portion of the first housing 10 is further formed with an arc-shaped part 16 having at least a folding line 17 which is used to facilitate the arc-shaped part 16 to be bent at a certain angle. In addition, two sides of the arc-shaped part 16 are respectively and longitudinally formed with a cut line 18, thereby enabling the first housing 10 to stand more easily.

Figure 7:
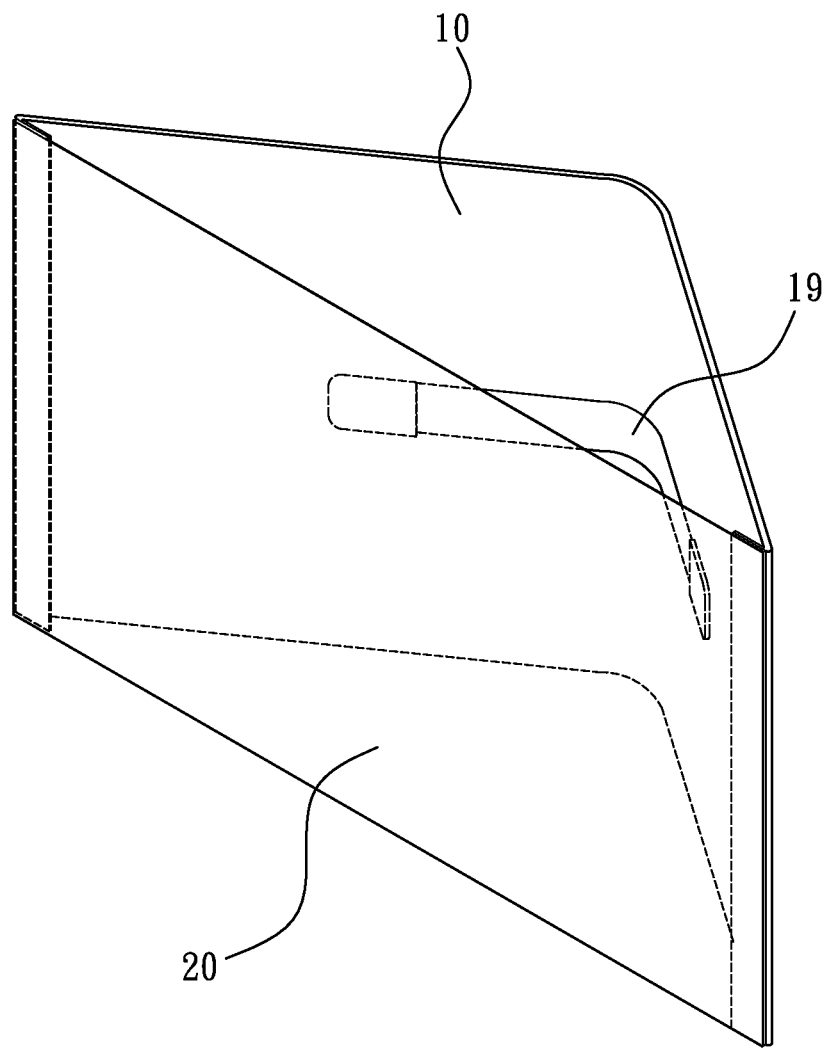
FIG. 7 is a schematic view illustrating the foldable projection screen being further installed with an elastic member, according to one preferred embodiment of the present invention.

Referring to FIG. 7, which is a schematic view showing the foldable projection screen being further installed with an elastic member, according to one preferred embodiment of the present invention. As shown in FIG. 7, the foldable projection screen provided by the present invention is further installed with an elastic member 19 having its two ends fastened at the substantial inner central portion of the first housing 10, thereby enabling the first housing 10 to be stretched to a larger angle through the elastic force provided by the elastic member 19. The elastic member 19 is, e.g. but not limited to, an iron sheet having elasticity or a torsion spring.

Figure 8:
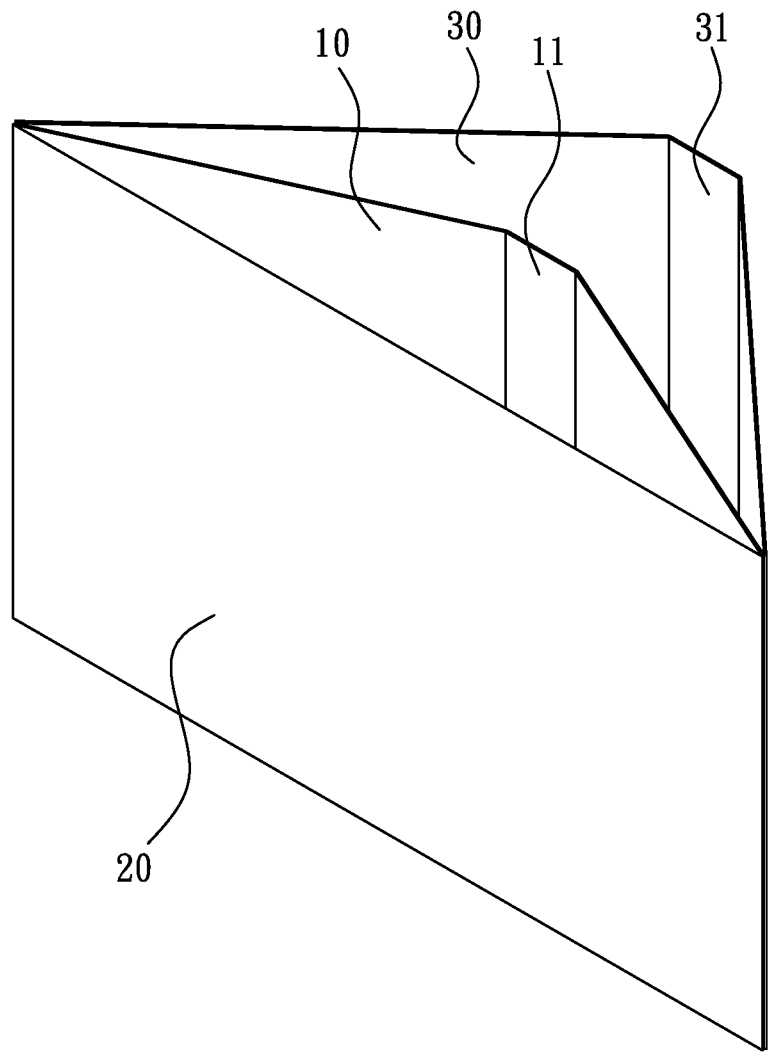
FIG. 8 is a schematic view illustrating the foldable projection screen being further provided with a second housing, according to one preferred embodiment of the present invention.

Referring to FIG. 8, which is a schematic view showing the foldable projection screen being further provided with a second housing, according to one preferred embodiment of the present invention. As shown in FIG. 8, the foldable projection screen of the present invention can be further provided with a second housing 30 disposed at the exterior of the first housing 10, the interior of the second housing 30 can be fastened on the first housing 10 through a Velcro fastener, glue, button or iterative pressure sensitive adhesive. In addition, the central portion of the second housing 30 can be further formed with an outward-folded flat part 31 for folding and accommodating the outward-folded flat part 11 of the first housing 10.

Figure 9:
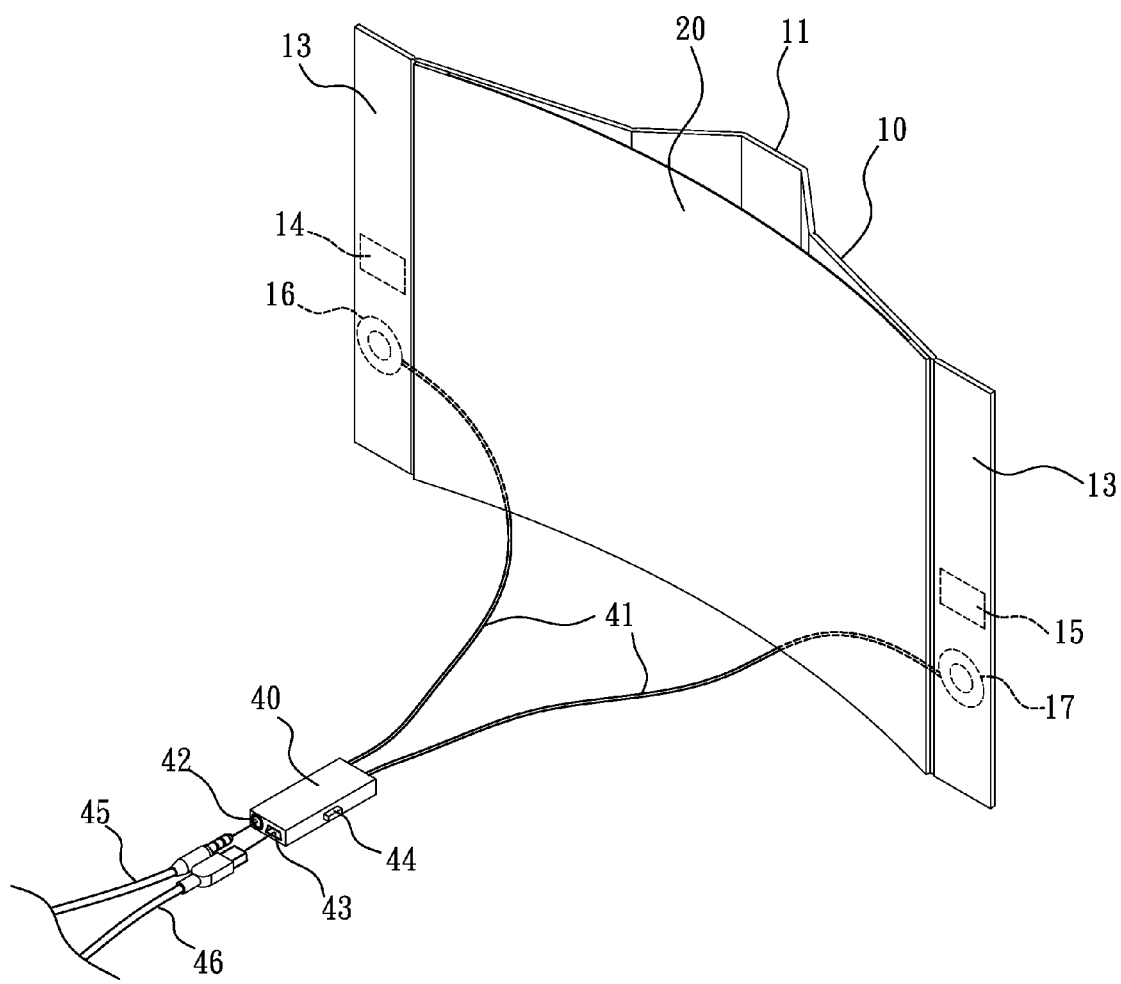
FIG. 9 is a schematic view illustrating the inward-folded flat part of the foldable projection screen being further provided with a speaker, according to one preferred embodiment of the present invention.

Referring to FIG. 9, which is a schematic view illustrating the inward-folded flat part of the foldable projection screen being further provided with a speaker, according to one preferred embodiment of the present invention. As shown in FIG. 9, the foldable projection screen of the present invention further comprises a switch box 40, and the inward-folded flat parts 13 at two sides of the first housing 10 are respectively installed with a speaker 16, 17. The switch box 40 can be stored in a space defined between the outward-folded flat part 11 and the projection screen 20, and one end of the switch box 40 has a pair of electric wires 41 respectively connected to the speaker 16, 17, the other end of the switch box 40 has an audio source socket 42 and a USB socket 43, and one side of the switch box 40 has a switch 44, wherein the audio source socket 42 allows an audio source cable 45 to be inserted therein so as to be connected to an audio source, e.g. but not limited to a computer mainframe or MP3 player (both not shown in figures), the USB socket 43 allows a USB cable 46 to be inserted therein so as to be connected to the computer mainframe, and the switch 44 is used to enable or disable the switch box 40. As such, the foldable projection screen of the present invention can be connected to a computer mainframe or MP3 player for displaying and projecting video/audio programs.

As what is disclosed above, it is known that the foldable projection screen provided by the present invention has advantages of small in volume, light in weight and easy to be carried around, therefore solving the problems and disadvantages of a conventional foldable projection screen.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A foldable projection screen comprising:
    a first housing capable of being folded for engagement and capable of standing while being unfolded; and
    a projection screen having its two sides respectively fastened on two sides of said first housing so as to be folded and accommodated in the first housing;
    wherein the central portion of said first housing is further formed with an outward-folded flat part having its two sides being respectively and longitudinally formed with a cut line.

2. The foldable projection screen as claimed in claim 1, wherein said first housing is made of a material selected from a group consisting of paper, plastic, metal and rubber.

3. The foldable projection screen as claimed in claim 1, wherein said projection screen is a high gain projection screen.

4. The foldable projection screen as claimed in claim 1, wherein said projection screen is made of a material selected from a group consisting of paper, rubber, thermoplastic elastic polymer, fabric and plastic.

5. The foldable projection screen as claimed in claim 4, wherein said thermoplastic elastic polymer is selected from a group consisting of thermoplastic polyurethane (TPR) and thermoplastic polyurethane (TPU).

6. The foldable projection screen as claimed in claim 1, further comprising an elastic member fastened at the substantial inner central portion of said first housing, wherein said elastic member is selected from a group consisting of an iron sheet having elasticity and a torsion spring.

7. The foldable projection screen as claimed in claim 1, wherein said projection screen is fastened on said first housing through a material selected from a group consisting of a Velcro fastener, glue, button, and iterative pressure sensitive adhesive.

8. The foldable projection screen as claimed in claim 1, wherein two sides of said first housing are respectively formed with an inward-folded flat part, and the two inward-folded flat parts respectively have a magnetic member with opposite magnetism, thereby folding said first housing in a rectangular shape through said magnetic members.

9. The foldable projection screen as claimed in claim 8, wherein said inward-folded flat part further comprises a speaker.

10. The foldable projection screen as claimed in claim 9, further comprising a switch box stored in a space defined between the outward-folded flat part and the projection screen, wherein one end of the switch box has a pair of electric wires respectively connected to the speaker, the other end of the switch box has an audio source socket and a USB socket, and one side of the switch box has a switch, wherein the audio source socket allows an audio source cable to be inserted therein so as to be connected to an audio source, the USB socket allows a USB cable to be inserted therein so as to be connected to a computer mainframe, and the switch is used to enable or disable the switch box.

11. A foldable projection screen comprising:
   a first housing capable of being folded for engagement and capable of standing while being unfolded; and
   a projection screen having its two sides respectively fastened on two sides of said first housing so as to be folded and accommodated in the first housing;
   wherein said central portion of said first housing is further formed with an arc-shaped part having at least a folding line; two sides of the arc-shaped part are respectively and longitudinally formed with a cut line.

12. The foldable projection screen as claimed in claim 11, wherein said first housing is made of a material selected from a group consisting of paper, plastic, metal and rubber.

13. The foldable projection screen as claimed in claim 11, wherein said projection screen is a high gain projection screen.

14. The foldable projection screen as claimed in claim 11, wherein said projection screen is made of a material selected from a group consisting of paper, rubber, thermoplastic elastic polymer, fabric and plastic.

15. The foldable projection screen as claimed in claim 11, wherein said thermoplastic elastic polymer is selected from a group consisting of thermoplastic polyurethane (TPR) and thermoplastic polyurethane (TPU).

16. The foldable projection screen as claimed in claim 11, further comprising an elastic member fastened at the substantial inner central portion of said first housing, wherein said elastic member is selected from a group consisting of an iron sheet having elasticity and a torsion spring.

17. The foldable projection screen as claimed in claim 11, wherein said projection screen is fastened on said first housing through a material selected from a group consisting of a Velcro fastener, glue, button, and iterative pressure sensitive adhesive.

18. A foldable projection screen comprising:
   a first housing capable of being folded for engagement and capable of standing while being unfolded;
   a projection screen having its two sides respectively fastened on two sides of said first housing so as to be folded and accommodated in the first housing; and
   a second housing disposed at the exterior of said first housing, wherein the interior of said second housing is fastened on said first housing through a material selected from a group consisting of a Velcro fastener, glue, button and iterative pressure sensitive adhesive.

19. The foldable projection screen as claimed in claim 18, wherein the central portion of said second housing is formed with an outward-folded flat part for folding and accommodating said first housing.

\* \* \* \* \*